(12) United States Patent
Nagae et al.

(10) Patent No.: US 6,468,687 B1
(45) Date of Patent: Oct. 22, 2002

(54) ALKALINE STORAGE BATTERY WITH REINFORCED SEPARATORS

(75) Inventors: Teruhito Nagae, Tokushima (JP); Kenji Arisawa, Sumoto (JP); Etsuya Fujisaka, Tsuna-Gun (JP); Masao Takee, Itano-Gun (JP); Takeo Hamamatsu, Tokushima (JP); Taishi Maeda, Itano-Gun (JP); Satoru Kometani, Itano-Gun (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/531,672

(22) Filed: Mar. 20, 2000

(30) Foreign Application Priority Data

Mar. 19, 1999 (JP) .......................................... 11-076325
Sep. 1, 1999 (JP) .......................................... 11-247374

(51) Int. Cl.[7] ........................ H01M 2/14; H01M 10/28; H01M 6/10
(52) U.S. Cl. ........................................ 429/94; 429/144
(58) Field of Search ............................ 429/94, 144, 57, 429/61

(56) References Cited

U.S. PATENT DOCUMENTS

| 3,900,340 | A | | 8/1975 | Greaser et al. |
| 4,663,247 | A | * | 5/1987 | Smilanich et al. .......... 429/177 |
| 5,902,696 | A | * | 5/1999 | Smesko et al. |

FOREIGN PATENT DOCUMENTS

| EP | 0843373 A2 | | 5/1998 |
| EP | 1022790 A2 | * | 7/2000 |
| GB | 1511305 | | 5/1978 |
| JP | 56-32674 A | * | 4/1981 |
| JP | 4-342954 A | * | 11/1992 |

* cited by examiner

Primary Examiner—Patrick Ryan
Assistant Examiner—Susy Tsang-Foster
(74) Attorney, Agent, or Firm—Nixon & Vanderhye P.C.

(57) ABSTRACT

An alkaline storage battery has a group of spiral electrodes composed of positive and negative electrode plates spirally wound with first and second separators respectively located at the outside of the positive electrode plate and at the inside of the positive electrode plate. The weight per unit area of the first separator is greater than that of the second separator.

7 Claims, 3 Drawing Sheets

ALKALINE STORAGE BATTERY WITH
REINFORCED SEPARATORS

BACKGROUND OF THE INVENTION

1. Field of the Invention

The present invention relates to an alkaline storage battery such as a nickel-cadmium storage battery, a nickel-metal hydride storage battery or the like. More particularly, the present invention is concerned with an improvement of separators in an alkaline storage battery including a group of electrodes in which positive and negative electrode plates are spirally wound up with separators interposed therebetween.

2. Description of the Prior Art

Generally, in an alkaline storage battery such as a nickel-cadmium storage battery, a nickel-metal hydride storage battery or the like, positive and negative electrode plates are spirally wound up with separators interposed respectively therebetween to provide a group of electrodes, and a set of current collectors are connected to the opposite ends of the group of electrodes to provide a cylindrical electrode assembly. The electrode assembly is contained in a metallic cylindrical cell casing, and a lead plate extended from the current collector for the positive electrode is welded to a bottom of a closure element. Thereafter, the cell casing is supplied with an amount of electrolyte, and the closure element is coupled with an opening of the cell casing through an insulation gasket in a liquid-tight manner.

In a manufacturing process of a nickel-cadmium battery, for example, a nickel positive electrode plate is produced by impregnating an amount of nickel active material into a sintered nickel substrate plate in a chemical-permeation method, and a cadmium negative electrode plate is produced by impregnating an amount of cadmium active material into a sintered nickel substrate plate in the chemical-permeation method. Thereafter; the nickel positive electrode plate and cadmium negative electrode plate are spirally wound up with separators interposed therebetween to provide a group of spiral electrodes.

In recent years, there has been a demand for a higher capacity and a higher output m such an alkaline storage battery of this kind. To satisfy this demand, it is required to impregnate the active materials into the substrate plates at a higher density, and it is also required to form the separator as thin as possible. However, in a storage battery comprised of electrode plates impregnated with the active materials at a higher density and a separator formed as thin as possible, there is a problem that short-circuits will occur at a higher rate. To investigate the cause for such a short-circuit, a storage battery that suffered from a short-circuit was disassembled. As a result, it has been found that cracks and burrs in the positive electrode plate and damage of the active material in the positive electrode plate were caused at the outside of the positive electrode plate of the spiral electrode assembly, resulting in frequent occurrences of a short-circuit due to fragments or powders penetrating the separator. On the other hand, it has been confirmed that any short-circuit caused by cracks and burrs in the positive electrode plate and damage of the active material did not occur at all at the inside of the positive electrode plate of the spiral electrode assembly. In this respect, it is assumed that the positive electrode plate becomes fragile due to the active material impregnated therein at a higher density for increasing the capacity and output of the storage battery, resulting in the occurrence of cracks and burrs in the positive electrode plate and damage of the positive electrode plate in the winding process of the electrode plates, and it is also assumed that the strength of the separator is deteriorated due to a process for forming the separator as thin as possible, resulting in the occurrence of fragments or powders of the positive electrode plate penetrating therethrough.

SUMMARY OF THE INVENTION

It is, therefore, a primary object of the present invention to provide an alkaline storage battery wherein a separator placed at the outside of a positive electrode plate in a group of spiral electrodes is reinforced to eliminate an occurrence of short-circuit without causing any deterioration of the performance of the storage battery.

According to the present invention, the object is accomplished by providing an alkaline storage battery having a group of spiral electrodes composed of positive and negative electrode plates spirally wound with separators composed of a first separator placed at the outside of the positive electrode plate and a second separator placed at the inside of the positive electrode plate, and wherein the thickness of the first separator is made larger than that of the second separator.

In use of separators in the storage battery, the mechanical strength of the first separator placed at the outside of the positive electrode plate is reinforced to eliminate an occurrence of short-circuit in the storage battery caused by cracks and burrs in the positive electrode plate and damage of the active material without causing any deterioration of the battery performance such as characteristics in discharge capacity, operation voltage and the like.

In a practical embodiment of the present invention, it is preferable that the first separator is made of two layers, each thinner than the second separator but together formed into a composite first separator thicker than said second separator. In such an embodiment, the first and second separators are spirally wound with the positive electrode plate in such a manner that the two sheets of thin separators are placed on the outside of the positive electrode plate. Thus, the first separator can be provided thicker than the second separator in a simple manner during the winding process of the separators.

To reinforce the first separator, the basis weight of the first separator may be made larger than that of the second separator in such a manner that an occupancy ratio of the first separator becomes equal to that of the second separator. In this case, the mechanical strength of the first separator can be reinforced to prevent fragments or powders of the positive electrode plate from penetrating the separators thereby to eliminate an occurrence of short-circuit without causing any deterioration of the battery performance.

In a practical embodiment of the present invention, it is also preferable that the first and second separators are made of split short and long fibers of polyolefin resin uniformly entangled with each other, wherein the basis weight of the first separator is made larger than that of the second separator. In use of the separators, the surface area of the separators is increased by the split short fibers to enhance the retention property of electrolyte and to suppress an increase of the internal pressure of the storage battery, and the porosity of the separators is increased by the split long fibers to enhance the gas permeability of the separators. Accordingly, the separators are useful to eliminate an occurrence of short-circuit, to enhance the utilization ratio of the active material and to prevent an increase of the internal pressure of the storage battery.

BRIEF DESCRIPTION OF THE DRAWINGS

Other objects, features and advantages of the present invention will be more readily appreciated from the following detailed description of preferred embodiments thereof when taken together with reference to the accompanying drawings, in which.

DESCRIPTION OF THE PREFERRED EMBODIMENTS

Figure 1:
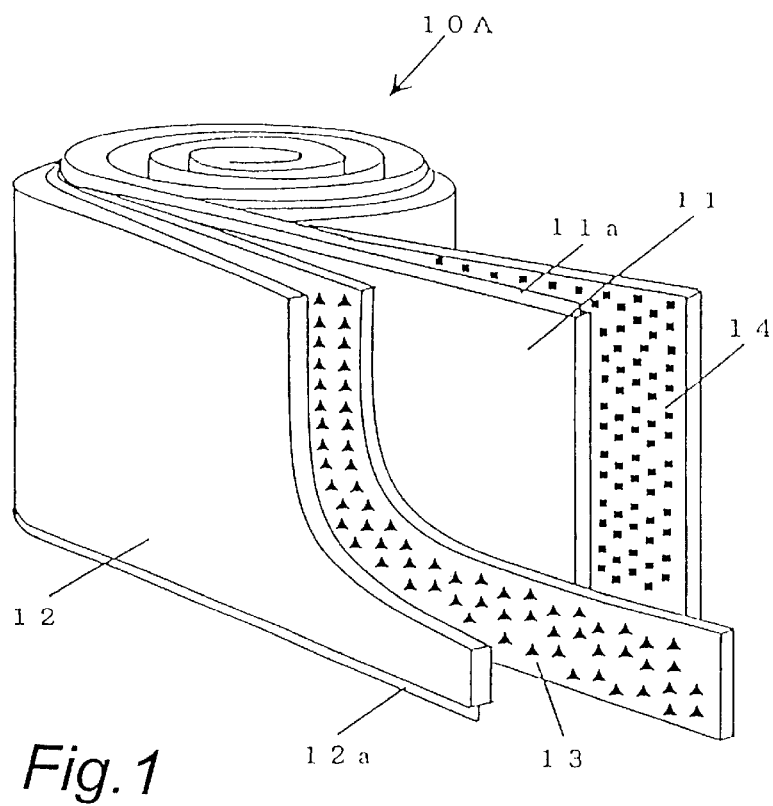
FIG. 1 is a perspective view of a first example of an electrode assembly in a first embodiment of the present invention.
Figure 2:
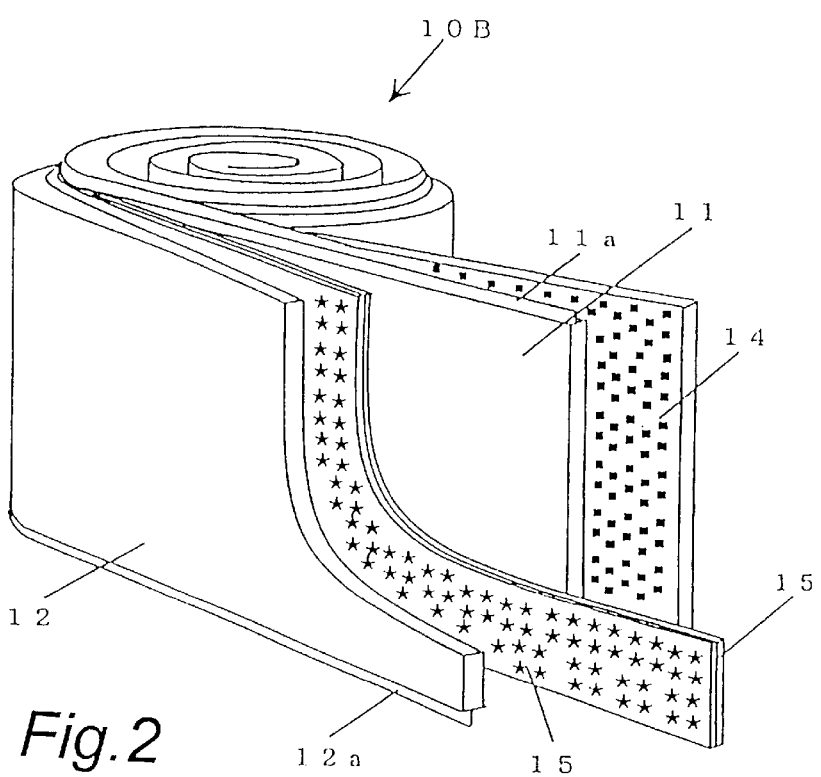
FIG. 2 is a perspective view of a second example of an electrode assembly in the first embodiment of the present invention.
Figure 3:
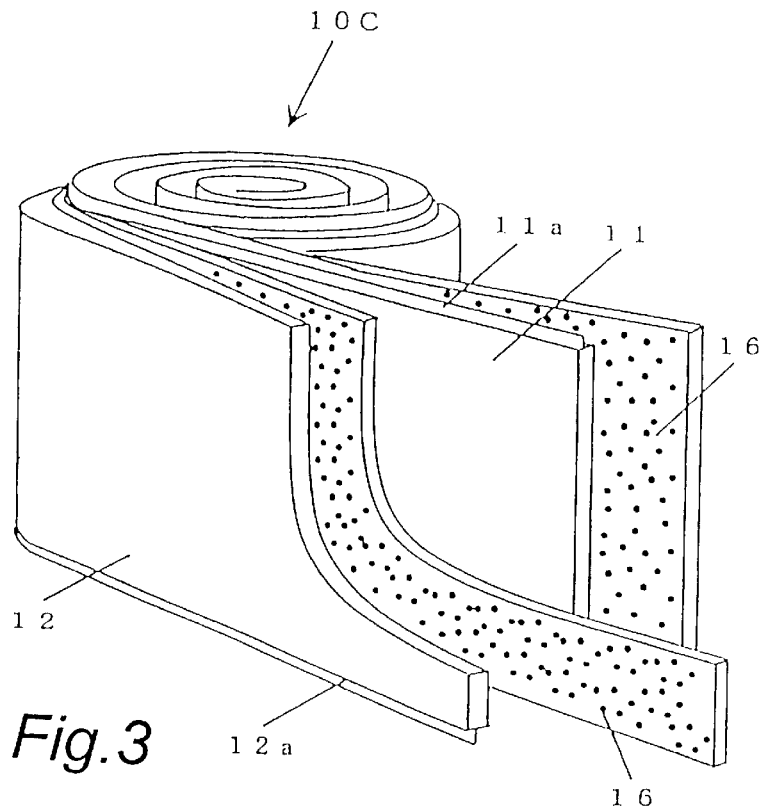
FIG. 3 is a perspective view of a comparative example of an electrode assembly in the first embodiment of the present invention.

A: First Embodiment:

Hereinafter, a first embodiment of the present invention applied to a nickel-cadmium storage battery will be described with reference to the accompanying drawings. FIG. 1 illustrates a main portion of an electrode assembly of an Example 1 in the first embodiment, FIG. 2 illustrates a main portion of an electrode assembly of an Example 2 in the first embodiment, and FIG. 3 illustrates a main portion of an electrode assembly of a Comparative Example in the first embodiment.

A-1. Production of a sintered nickel substrate:

A mixture of nickel powder and thickener such as carboxymethyl cellulose was added with an amount of water and kneaded to prepare a slurry, and a conductive core plates 11a, 12a each in the form of a punched sheet metal made of nickel were coated with the slurry. Thereafter, the conductive core plates 11a, 12a coated with the slurry were sintered in a reduction atmosphere to produce a sintered nickel substrate of 80% in porosity.

A-2. Production of a nickel positive electrode plate:

The sintered nickel substrate was impregnated with a predetermined amount of nickel active material by a chemical impregnation method. Specifically, the sintered nickel substrate was immersed in an aqueous solution containing nickel nitrate as a main component such that the nickel nitrate is deposited in the pores of the sintered nickel substrate. Thereafter, the sintered nickel substrate was immersed in an aqueous sodium hydroxide to substitute the nickel nitrate deposited in the pores for sodium hydroxide. Similar treatments were repeated predetermined times (for instance, 6 to 8 times) to produce a nickel positive electrode plate 11 comprised of a sintered nickel substrate impregnated with a predetermined amount of nickel active material containing nickel hydroxide at a main component.

A-3. Production of a cadmium negative electrode plate:

The sintered nickel substrate was impregnated with a predetermined amount of cadmium active material by a chemical impregnation method. Specifically, the sintered nickel substrate was immersed in an aqueous solution containing cadmium nitrate as a main component such that the cadmium nitrate is deposited in the pores of the sintered nickel substrate. Thereafter, the sintered nickel substrate was immersed in an aqueous sodium hydroxide to substitute the cadmium nitrate deposited in the pores for cadmium hydroxide. Similar treatments were repeated predetermined times (for instance, 6 to 8 times) to produce a cadmium negative electrode plate 12 comprised of a sintered nickel substrate impregnated with a predetermined amount of cadmium active material containing cadmium hydroxide as a main component.

A-4. Production of an electrode assembly:

(1) EXAMPLE 1

A first separator 13 made of unwoven polyethylene or polypropylene fabric of 0.20 mm in thickness and 85 $g/m^2$ in basis weight and a second separator 14 made of unwoven polyethylene or polypropylene fabric of 0.16 mm in thickness and 65 $g/m^2$ in basis weight were prepared. As illustrated in FIG. 1, the sintered nickel positive electrode plate 11 was interposed between the first and second separators 13 and 14, and the cadmium negative electrode plate 12 was arranged outside of the first separator 13. Thus, the stacked electrode plates and separators were spirally wound to produce a spiral electrode assembly 10A as an Example 1.

(2) EXAMPLE 2

Two sheets of first separators 15 made of unwoven polyethylene or polypropylene fabric of 0.10 mm in thickness and 45 $g/m^2$ in basis weight and a second separator 14 made of unwoven polyethylene or polypropylene fabric of 0.16 mm in thickness and 65 $g/m^2$ in basis weight (the same separator as the second separator of the Example 1) were prepared. As illustrated in FIG. 2, the sintered nickel positive electrode plate 11 was interposed between the first separators 15 overlapped with each other and the second separator 14, and the cadmium negative electrode plate 12 was placed outside of the first separators 15. Thus, the stacked electrode plates and separators were spirally wound to produce a spiral electrode assembly 10B as an Example 2.

(3) Comparative Example

Two sheets of separators 16 made of unwoven polyethylene or polypropylene fabric of 0.18 mm in thickness and 75 $g/m^2$ in basis weight were prepared. As illustrated in FIG. 3, the sintered nickel positive electrode plate 11 was interposed between the separators 16, 16, and the cadmium negative electrode plate 12 was placed outside of the separators 16. Thus, the stacked separators and electrode plates were spirally wound to produce a spiral electrode assembly 10C as a Comparative Example.

A-5. Manufacture of a nickel-cadmium storage battery:

A positive current collector was welded to a distal end of each conductive core plate 11a exposed at the upper end of the respective electrode assemblies 10A, 10B, 10C, while a negative current collector was welded to a distal end of each conductive core plate 12a exposed at the bottom of the respective electrode assemblies 10A, 10B, 10C. The electrode assemblies 10A, 10B, 10C each were inserted into a cylindrical cell casing of nickel-plated iron, the negative current collector was welded to an internal bottom surface of the cell casing, a lead plate extended from the positive current collector was welded to a bottom surface of a closure element. Subsequently, a predetermined amount of electrolyte (an aqueous solution of potassium hydroxide of 30 wt %) was injected into the cell casing.

Thereafter, the closure element was coupled within an opening end of the cell casing through an insulation gasket and secured in place by caulking to close the cell casing in a liquid-tight manner, thereby to manufacture nickel-cadmium storage batteries A, B and C, respectively of 1.7

Ah in nominal capacity and of SC size. In the manufacturing process, the electrode assemblies 10A, 10B and 10C were used to manufacture the nickel-cadmium storage batteries A, B and C in the Examples 1, 2 and Comparative Example, respectively.

A-6. Tests:

(1) Measurement of short-circuit

Every 10,000 pieces of the storage batteries A, B and C manufactured as described above were prepared to measure each open circuit voltage thereof. In the measurement, an open circuit voltage equal to or less than 0.4 V was judged as an occurrence of short-circuit. The occurrence ratios of short-circuit in the storage batteries A, B and C are listed in the following Table 1.

TABLE 1

| Type of Battery | Occurrence ratio of short-circuit (%) |
| --- | --- |
| A | 0.01 |
| B | 0.01 |
| C | 0.20 |

As is understood from the Table 1, it has been found that the occurrence ratios of short-circuit in the storage batteries A and B of Examples 1 and 2 were reduced. Such a result was obtained by the fact that the thickness and basis weight of the first separator 13 (15, 15) placed outside of the positive nickel electrode plate 11 in the respective electrode assemblies 10A, 10B were made larger than those of the second separator 14 placed inside of the positive nickel electrode plate.

(2) High-rate discharge property and Internal gas pressure

The storage batteries A, B and C manufactured as described above each were charged by a charging current of 1.7 A (1C) for 72 minutes in an atmosphere of 25 C. and rested for 60 minutes. Thereafter, the storage batteries were discharged at a constant current (2A, 10A, 30A) until the battery voltage becomes 0.8 V. Thus, a discharge capacity and an operation voltage of the storage batteries at each discharge current were measured as shown in the following Table 2.

TABLE 2

| | Discharge Current | | | | | |
| --- | --- | --- | --- | --- | --- | --- |
| | 2A | | 10A | | 30A | |
| Type of Battery | Discharge capacity (mAh) | Operation voltage (V) | Discharge capacity (mAh) | Operation voltage (V) | Discharge capacity (mAh) | Operation voltage (V) |
| A | 1785 | 1.222 | 1678 | 1.163 | 1483 | 1.035 |
| B | 1783 | 1.222 | 1675 | 1.163 | 1481 | 1.036 |
| C | 1780 | 1.222 | 1672 | 1.162 | 1480 | 1.034 |

On the other hand, each of the storage batteries A, B and C was charged by a charging current of 2A (constant current) in an atmosphere of 25 C. to memorize a peak value of the battery voltage as a reference value at the end stage of charging. When the battery voltage dropped in a predetermined value less than the reference value, the charge of the battery was ended. After rested for one hour, the battery was discharged at constant current of 2A until the battery voltage becomes 0.7 V and rested for one hour. Such a-Δ V cycle test as described above was carried out to measure an internal pressure (a maximum gas pressure) of the respective storage batteries discharged at 2A. A result of the measurement is shown in the following Table 3. In addition, a-Δ V cycle test was carried out at a discharging current of 10A to measure an internal pressure of each of the storage batteries discharged at 10A. A result of the measurement is also shown in the following Table 3.

TABLE 3

| Type of Battery | Maximum Gas Pressure MPa | |
| --- | --- | --- |
| | 2A | 10A |
| A | 0.48 | 0.71 |
| B | 0.47 | 0.73 |
| C | 0.48 | 0.73 |

As is understood from the Tables 2 and 3, the high-rate discharge capacity, operation voltage and internal pressure of each of the storage batteries A and B in the Examples 1 and 2 was substantially the same as those of the storage battery C in the Comparative Example. That is to say, any deterioration of the high-rate discharge property, operation voltage was not observed in the storage batteries A and B, and also any increase of the internal pressure was not observed in the storage batteries A and B for the following reasons.

In the electrode assembly 10A for the storage battery A of the Example 1, the thickness (0.20 mm) and basis weight (85 g/m$^2$) of the first separator 13 placed outside of the positive nickel electrode plate 11 are determined larger than the thickness (0.16 mm) and basis weight (65 g/m$^2$) of the second separator 14 placed inside of the positive nickel electrode plate 11, whereas the thickness and basis weight of the second separator 14 are determined smaller than the thickness (0.18 mm) and basis weight (75 g/m$^2$) of the separators (16, 16) in the Comparative Example. In other words, the average thickness (0.18 mm) and basis weight (75 g/m$^2$) of the first and second separators 13 and 14 are determined to be substantially the same as the thickness and basis weight of the separators (16, 16) such that the occupancy rate of the separators in the storage battery becomes the same value.

In the electrode assembly 10B for the storage battery B of the Example 2, the entire thickness (0.20 mm) and basis weight (90 g/m$^2$) of the first separators 15, 15 placed outside of the positive nickel electrode plate 11 are determined larger than the thickness (0.16 mm) and basis weight (65 g/m$^2$) of the second separator 14 placed inside of the positive electrode plate 11, whereas the thickness and basis weight of the second separator 14 are determined smaller than the thickness (0.18 mm) and basis weight (75 g/m$^2$) of the separators 16, 16 in the Comparative Example. In other words, the average thickness (0.18 mm) and basis weight (77.55 g/m$^2$) of the first and second separators 15, 14 are determined to be substantially the same as those of the separators 16, 16 such that the occupancy rate of the separators in the storage battery becomes the same value.

With such adjustment of the thickness and basis weight of the first separator 13 (15, 15) relative to those of the second separator 14 in the alkaline storage battery as described above, the occurrence of short-circuit caused by cracks and burrs in the positive-electrode plate 11 and damage of the active material can be avoided without causing any deterioration of the battery property.

Although in the first embodiment, the first and second separators were separately used, the separators may be provided in the form of a single separator one half of which is adjusted in thickness and basis weight as in the first separator and the other half of which is adjusted in thickness and basis weight as in the second separator. Although in the first embodiment, a sintered electrode plate was used as the positive and negative electrode plates of the nickel-cadmium storage battery, a non-sintered electrode plate such as a paste type electrode plate may be used as the positive and negative electrode plates to obtain the same results as those described above.

B: Second Embodiment

Figure 4:
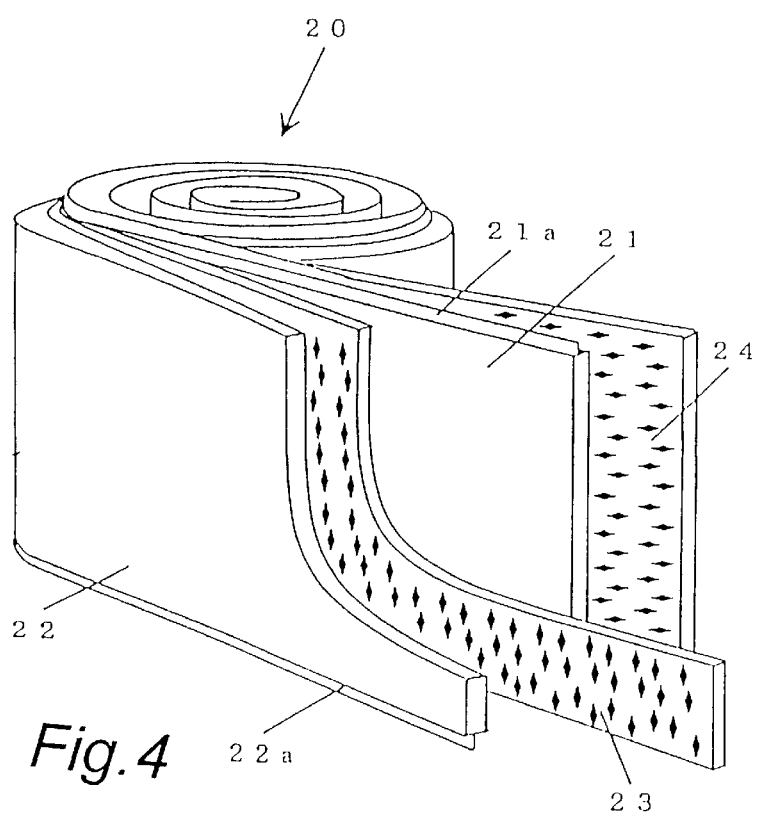
FIG. 4 is a perspective view of an electrode assembly in a second embodiment of the present invention.

Hereinafter, a second embodiment of the present invention applied to a nickel-metal hydride storage battery will be described with reference to FIG. 4 of the accompanying drawings.

B-1. Manufacture of a nickel positive electrode plate:

A slurry of a positive electrode active material was prepared by mixing 100 parts by weight of a positive electrode active material powder essentially comprised of nickel hydroxide and 50 parts by weight of an aqueous solution in which 0.2 parts by weight of hydroxypropyl cellulose has been dissolved. The slurry of the positive electrode active material was impregnated into a foamed nickel 21a of 95% in porosity and rolled under pressure after dried to prepare a positive nickel electrode plate 21 for a storage battery of 1200 mAh in nominal capacity.

B-2. Manufacture of a negative electrode plate of hydrogen absorbing alloy:

A paste of hydrogen absorbing alloy was prepared by mixing an appropriate amount of water with powders of hydrogen absorbing alloy produced in a high frequency melting furnace and a binder such as polytetrafluoroethylene (PTFE). The paste of hydrogen absorbing alloy was coated on opposite surfaces of a negative electrode substrate 22a made of punched sheet metal and pressed after dried to produce a negative electrode plate of hydrogen absorbing alloy in a predetermined thickness for a storage battery of 2000 mAh in nominal capacity.

B-3. Manufacture of separators:

(1) Manufacture of a first ground fabric of the dry-type

Long fibers of more than 25 mm (for example, 50 mm) in fiber length in the form of split fibers essentially comprised of polyolefin resin were dispersed in the air and collected by wire netting. The collected long fibers were formed in a paper in such a manner that the basis weight becomes 20 $g/m^2$ to 30 $g/m^2$. Thus, a first ground fabric of the dry type was made of the long fibers.

(2) Manufacture of a second ground fabric of the wet-type

Short fibers of equal to or less than 10 mm (for example, 6 mm) in fiber length in the form of split fibers essentially comprised of polyolefin resin were dispersed in the water and formed in a paper in such a manner that the basis weight becomes 20 $g/m^2$, 25 $g/m^2$, 30 $g/m^2$, 35 $g/m^2$, 40 $g/m^2$, 45 $g/m^2$ and 50 $g/m^2$, respectively. Thus, a second ground fabric of the wet-type was made of the short fibers.

(3) Manufacture of a combined ground fabric

The first ground fabric of 2 $g/m^2$ in basis weight was overlapped with the second ground fabrics of 20 $g/m^2$, 25 $g/m^2$, 30 $g/m^2$, 35 $g/m^2$, 40 $g/m^2$, 45 $g/m^2$, 50 $g/m^2$ in basis weight respectively and subjected to a process for entangling fibers by high pressure water so that the long and short fibers are uniformly entangled. Thus, combined ground fabrics of 40 $g/m^2$, 45 $g/m^2$, 50 $gm^2$, 55 $g/m^2$, 60 $g/m^2$, 65 $g/m^2$, 70 $g/m^2$ were made of the long and short fibers. In addition, the first ground fabric of 30 $g/m^2$ in basis weight was overlapped with the second ground fabric of 30 $g/m^2$ in basis weight and subjected to the process for entangling fibers by high pressure water so that the long and short fibers are uniformly entangled. Thus, a combined ground fabric of 60 $g/m^2$ was made of the long and short fibers. Hereinafter, the combined ground fabrics of 40 $g/m^2$, 45 $g/m^2$, 50 $g/m^2$, 55 $g/m^2$, 60 $g/m^2$, 65 $g/m^2$, 70 $g/m^2$ are referred to a1, b1, c1, d1, e1, f1 and g1. Additionally, the combined ground fabric of 60 $g/m^2$ made of the first and second ground fabrics of 30 $g/m^2$ is referred to h1.

With the combined ground fabrics, the surface area of the separator is increased by the short fibers to enhance the liquid-sustainability of electrolyte and to suppress an increase of the internal pressure of the storage battery, and the porosity of the separator is increased by the long fibers to enhance the gas permeability of the separator.

(4) Hydrophilic treatment:

The combined ground fabrics a1, b1, c1, d1, e1, f1, g1, h1 each were put in a reaction container, and the container was exhausted by vacuum. Thereafter, fluorine gas diluted by nitrogen gas was introduced as a reaction gas into the reaction container to cause reaction with the combined ground fabrics for one minute. Thus, the fibers of the combined ground fabrics were subjected to a hydrophilic treatment to produce each separator enhanced in hydrophilic property. In the hydrophilic treatment, a corona discharging process, a sulfonating process or a surface activation process may be applied to the combined ground fabrics. Hereinafter, the separators using the combined ground fabrics a1, b1, c1, d1, e1, f1, g1, h1 are referred to separators a, b, c, d, e, f, g, h, respectively.

In the following Table 4, the separators a to b1 are listed to show their basis weights. The separators subjected to the hydrophilic treatment are useful to enhance the liquid-sustainability of electrolyte, utilization ratio of active material and discharge capacity of the storage battery.

TABLE 4

| Type of separator | Basis weight of First ground fabric/$m^2$ | Basis weight of Second ground fabric/$m^2$ | Basis weight of Combined ground fabric (g/$in^2$) |
| --- | --- | --- | --- |
| A | 20 | 20 | 40 |
| B | 20 | 25 | 45 |
| C | 20 | 30 | 50 |
| D | 20 | 35 | 55 |
| E | 20 | 40 | 60 |
| F | 20 | 45 | 65 |
| G | 20 | 50 | 70 |
| H | 30 | 30 | 60 |

B-4. Manufacture of Nickel-hydrogen storage battery:

Either one of the separators a to h was used as a first separator 23 and another one of the separators a to h was used as a second separator 24 to manufacture a nickel-hydrogen storage battery. In the manufacturing process of the storage battery, the positive nickel electrode plate 21 manufactured as described above was interposed between the first and second separators 23 and 24, and the negative electrode plate 22 of hydrogen absorbing alloy was placed outside of the first separator 23. The electrode plates 21 and 23 were spirally wound with the first and second separators 23 and 24 to produce a group of spiral electrodes 20. Subsequently, a positive current-collector was welded to a distal end of a conductive core plate 21a exposed at the upper end of the group of spiral electrodes 20, while a negative current-collector was welded to a distal end of a conductive core plate 22a exposed at the bottom of the grouped of spiral electrodes. Thereafter, the group of spiral electrodes 20 was inserted into a bottomed cylindrical cell casing of nickel-plated iron, the negative current-collector was welded to an internal bottom surface of the cell casing, a lead plate extended from the positive current-collector was welded to a bottom surface of a closure element, and a predetermined amount of electrolyte (an aqueous solution of 30 wt % potassium hydroxide) was injected into the cell casing.

Thereafter, the closure element was coupled within an opening end of the cell casing through an insulation gasket and secured in place by caulking to close the cell casing in a liquid-tight manner, thereby to manufacture each of nickel-hydrogen storage batteries D to K, respectively of 1.2 Ah in nominal capacity and of AA size. Hereinafter, the storage battery using the separator e as the first separator and the separator e as the second separator is referred to the storage battery D (X+Y=110, X/Y=1.2). Similarly, the storage battery using the separators f and b is referred to the storage battery E (X+Y=110, X/Y=1.44), the storage battery using the separators g and a is referred to the storage battery F (X+Y=110, X/Y=1.75), the storage battery using the separators c and e is referred to the storage battery G (X+Y=110, X/Y–0.83), the storage battery using the separators d and d is referred to the storage battery H (X+Y=110, X/Y=1), the storage battery using the separators f and e is referred to the storage battery I (X+Y=125, X/Y–1.08), the storage battery using the separators c and c is referred to the storage battery J (X+Y=100, X/Y=1), and the storage battery using the separators h and c is referred to the storage battery K (X+Y=110, X/Y=1.2). The characters X and Y in the parentheses represent the basis weight (g/m$^2$) of the first separator 23 and the basis weight (g/m$^2$) of the second separator 24.

B-5. Measurement:

(1) Measurement of the diameter of the group of spiral electrodes

The diameter of each group of spiral electrodes used for the storage batteries D to K was measured to calculate a ratio of winding diameter (%) of each group of spiral electrodes as shown in the following Table 5, wherein the diameter of the group of spiral electrodes used for the storage battery H is defined as 100.

(2) Initial activation of Storage battery

The storage batteries D to K were charged by a charging current of 120 mA (0.1 C) for sixteen hours and rested for one hour. Thereafter, the storage batteries D to K were discharged at 240 mA (0.2 C) until the final voltage becomes 1.0 V and rested for one hour. Such charging and discharging were repeated three times to activate the storage batteries D to K.

(3) Measurement of Short-circuit

Each open-circuit voltage of the storage batteries D to K was measured prior to activation thereof. In the measurement, an open-circuit voltage equal to or less than 0.3 V was judged as an occurrence of a short-circuit. The occurrence ratios of short-circuits in the storage batteries D to K are listed in the following Table 5.

(4) Measurement of Internal pressure of the storage battery

The storage batteries D to K were charged by a charging current of 1200 mA (1 C) for one hour. Upon lapse of the one hour, the internal pressure of the storage batteries was measured. A result of the measurement is shown in the following Table 5.

TABLE 5

| Type of battery | Structure of seperator outside/inside | Basis weight of separator | | | Winding diameter ratio % | Occurrence ratio of Short-circuit (%) | Internal pressure (kgf/cm$^2$) |
|---|---|---|---|---|---|---|---|
| | | X(g/m$^2$) | Y(g/m$^2$) | X/Y | | | |
| D | e/c | 60 | 50 | 1.2 | 100 | 0.02 | 5.5 |
| E | f/b | 65 | 45 | 1.44 | 100 | 0.01 | 6.0 |
| F | g/a | 70 | 40 | 1.75 | 100 | 0.01 | 8.0 |
| G | c/e | 50 | 60 | 0.83 | 100 | 0.15 | 5.5 |
| H | d/d | 55 | 55 | 1 | 100 | 0.10 | 5.5 |
| I | f/e | 65 | 60 | 1.08 | 105 | 0.02 | 7.0 |
| J | c/c | 50 | 50 | 1 | 98 | 0.12 | 7.0 |
| K | h/c | 60 | 50 | 1.2 | 100 | 0.10 | 5.5 |

As is understood from the Table 5, the occurrence ratio of short-circuit in the storage batteries D (X=60, Y=50), E (X=65, Y=45), F (X=70, Y=40), I (X=65, Y=60), K (X=60, Y=50) was noticeably decreased when compared with the storage batteries G (X=50, Y=60), H (X=55, Y=55), J (X=50, Y=50). When the storage battery H was broken up to investigate the cause of short-circuits therein, it has been found that all the short-circuits occurred at the outside of the positive electrode plate 21. From this fact, it is believed that an increase of the basis weight of the first separator 23 placed outside of the positive electrode plate 21 is useful to decrease the occurrence ratio of short-circuits.

In comparison of the storage battery D (X=60, Y=50) with the storage battery K (X=60, Y=50), it has been found that the occurrence ratio of short-circuits in the storage battery D decreased less than that in the storage battery K. Such result was obtained by the fact that the basis weight (40 g/m$^2$) of the second ground fabric used for the first separator 23 in the storage battery D is larger than the basis weight (30 g/m$^2$) of the second ground fabric used for the first separator 23 in the storage battery K. In the case that the basis weight of the second ground fabric is increased, the ratio of short fibers of less than 10 mm in fiber length is increased more than that of long fibers of more than 25 mm in fiber length so that the short fibers are uniformly entangled with the long fibers. This is effective to reduce irregularity of the basis weight and to decrease the occurrence ratio of short-circuits. For this reason, it is desirable that the basis weight of the second ground fabric used form the first separator 23 is increased as much as possible.

In the storage battery F, the occurrence ratio of short-circuits was decreased but the internal pressure was increased. This is caused by the fact that a large difference between the basis weight (70 g/m$^2$) of the first separator and the basis weight (40 g/m$^2$) of the second separator results in uneven distribution of the electrolyte and irregularity of gas absorbing reaction on the negative electrode 22 of hydrogen absorbing alloy. For this reason, it is desirable that the basis weight of the first separator is determined less than 1.5 times as much as the basis weight of the second separator.

Although in the storage battery I, the occurrence ratio of short-circuit was decreased, there is a difficulty in insertion of the group of spiral electrodes into the cell casing since the winding diameter ratio was 105. In addition, the remaining space in the storage battery was reduced due to an increase of the occupancy ratio of the separators in the cell casing. This causes a difficulty in gas absorption, resulting in an increase of the internal pressure. It is, therefore, required to decrease the basis weight of the second separator in accordance with an increase of the basis weight of the first separator.

(5) Measurement of Cycle span of life:

The activated storage batteries D to K were charged by a charging current of 1200 mA (1C) for sixteen hours and rested for one hour. Thereafter, the storage batteries D to K were discharged at 1200 mA (1C) until the final discharge voltage becomes 1.0 V. Such charging and discharging were repeated to calculate a discharge capacity of the storage battery based on the discharging time and to calculate a ratio of the discharge capacity of the storage battery relative the initial capacity of the same as a battery capacity ratio as shown in FIG. 5.

Figure 5:
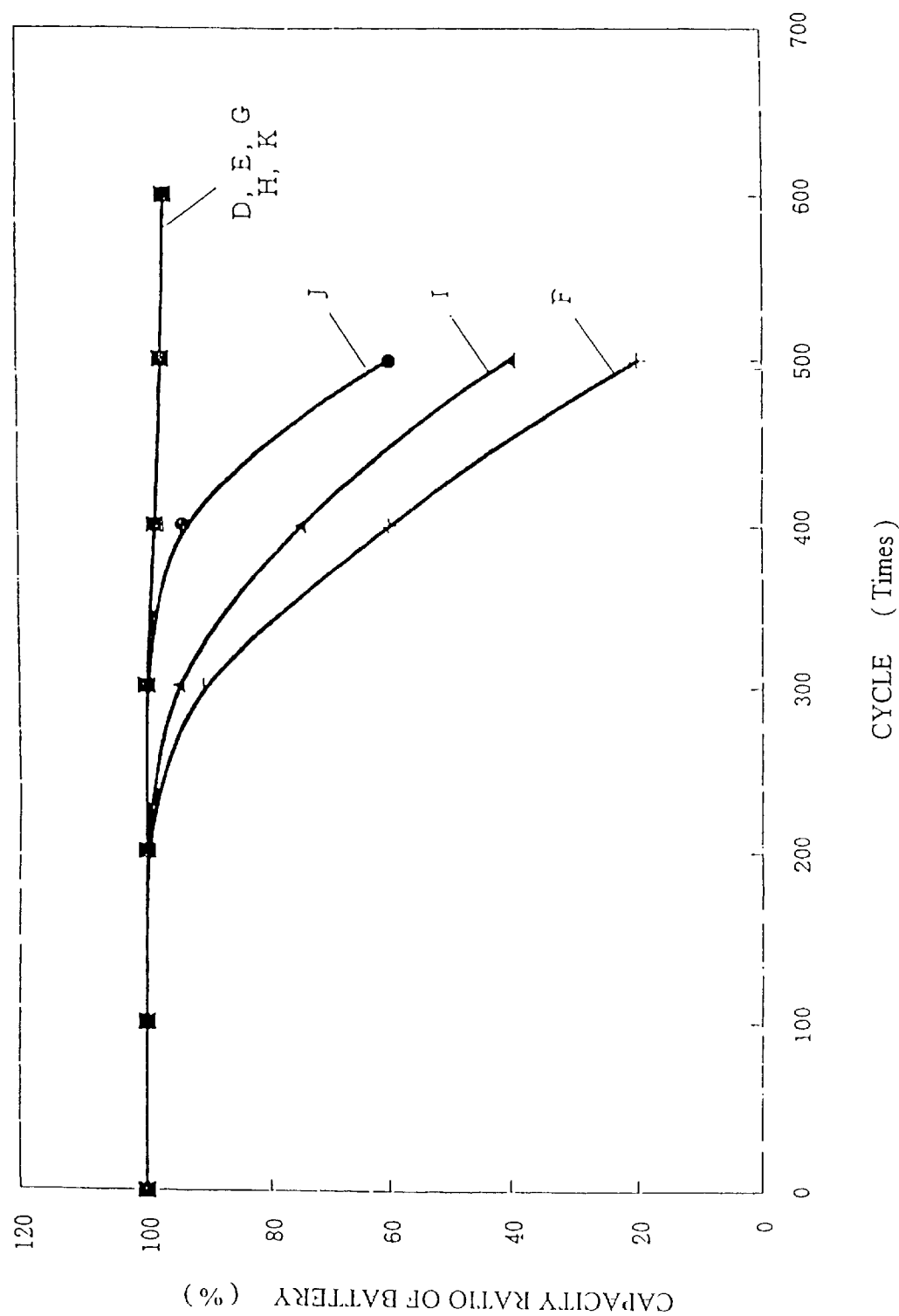
FIG. 5 is a graph showing each cycle characteristic of storage batteries in the second embodiment of the present invention.

As shown in FIG. 5, it has been found that the cycle span of life of each of the storage batteries D, E, G, H, K becomes longer than that of each of storage batteries J, I, F. It is assumed that the result was obtained for the following reasons. In the storage battery J, the entire basis weight of the first and second separators is 100 less than that of the separators in the other storage batteries, and the winding diameter is small. Accordingly, the amount of electrolyte retained in the separators is small and is decreased in accordance with the lapse of the cycle span of life, resulting in reduction of the cycle span of life. In the storage battery I, the remaining space in the cell casing is decreased due to an increase of the occupancy ratio of the separators. This causes a difficulty in bas absorption in the cell casing, resulting in reduction of the cycle span of life. In the storage battery F, the gas absorbing reaction becomes irregular due to a great difference in basis weight between the separators placed inside and outside of the positive electrode plate. This causes an increase of the internal pressure of the battery, resulting in reduction of the cycle span of life.

In contrast with the storage batteries J, I, F, the cycle span of life each of the storage batteries is prolonged. However, the strength of the first separator becomes insufficient due to the fact that the basis weight of the first separator is made smaller than that of the second separator. This causes an occurrence of short-circuit at the outside of the positive electrode plate. From the foregoing facts, it has been confirmed that the cycle span of life is prolonged in the case that the basis weight of the first separator placed on the outside of the positive electrode plate is determined larger than that of the second separator placed on the inside of the positive electrode plate in an extent of less than 1.5 times the basis weight of the second separator as in the storage batteries D and E and that the basis weight of the second ground fabric used for the first separator is determined larger than that of the first ground fabric.

As in the second embodiment, the first and second separators are made of short and long fibers uniformly entangled with each other, irregularity of the basis weight of the respective separators can be eliminated. In use of the separators, the mechanical strength of the second separator is reinforced by the first separator larger in basis weight than the second separator. This is useful to prevent an occurrence of short-circuit in the alkaline storage battery using the separators.

Although in the second embodiment, split long fibers were used as the long fibers for the first ground fabric while split short fibers were used as the short fibers for the second ground fabric, other long fibers such as long fiber in the form of adhesive fibers may be combined within the first ground fabric containing split long fibers. Similarly, other short fibers such as short fibers in the form of adhesive fibers may be combined within the second ground fabric containing split short fibers.

Although in the second embodiment, short fibers of 6 mm in fiber length was used for the second ground fabric, short fibers of less than 10 mm in fiber length may be used for the second ground fabric. In a viewpoint for the manufacture of the separator, it is preferable that short fibers of 3–10 mm in fibers length are used for the second ground fabric. Although in the second embodiment, long fibers of 50 mm in fiber length were used for the first ground fabric, long fibers of more than 25 mm in fiber length may be used for the first ground fabric. In a viewpoint for the manufacture of the separator, it is preferable that long fibers of 25–70 mm in fiber length are used for the first ground fabric.

In the embodiments described above, the present invention has been adapted to a cylindrical alkaline storage battery. However, the present invention is not limited to the embodiments and may be adapted to alkaline storage batteries of various shapes such as a cubic storage battery.

What is claimed is:

1. An alkaline storage battery comprising:
a group of spiral electrodes composed of a nickel positive electrode plate and a negative electrode plate spirally wound with separators composed of a first separator placed at the outside of said positive electrode plate and a second separator placed at the inside of said positive electrode plate, and
wherein said first separator is thicker than said second separator.

2. An alkaline storage battery as in claim 1 wherein said first separator is made of two layers, each layer being thinner than said second separator.

3. An alkaline storage battery comprising:
a group of spiral electrodes composed of a nickel positive electrode plate and a negative electrode plate spirally wound with separators composed of a first separator placed at the outside of said positive electrode plate and a second separator placed at the inside of said positive electrode plate, and
wherein the weight per unit area of said first separator is greater than that of said second separator.

4. An alkaline storage battery as in claim 1 wherein the thickness and weight per unit area of said first separator are both respectively greater than those of said second separator.

5. An alkaline storage battery as in claim 3 wherein said first and second separators are made of split short and long fibers of polyolefin resin uniformly entangled with each other.

6. An alkaline storage battery as in claim 5 wherein the weight per unit area of said first separator is increased more than that of said second separator to an extent that is less than 1.5 times the weight per unit area of said second separator.

7. An alkaline storage battery as in claim 5 wherein said first and second separators each are in the form of a combined ground fabric composed of a first ground fabric made of split short fibers of less than 10 mm in fiber length and a second ground fabric made of split long fibers of more than 25 mm in fiber length, and said first and second ground fabrics are combined in such a manner that the short and long fibers are uniformly entangled with each other.

* * * * *